US012154306B2

(12) United States Patent
Naito (10) Patent No.: US 12,154,306 B2
(45) Date of Patent: Nov. 26, 2024

(54) SCANNING DEVICE AND METHOD THEREFOR

(71) Applicant: TOSHIBA TEC KABUSHIKI KAISHA, Tokyo (JP)

(72) Inventor: Hidehiro Naito, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 360 days.

(21) Appl. No.: 17/730,244

(22) Filed: Apr. 27, 2022

(65) Prior Publication Data

US 2023/0045294 A1 Feb. 9, 2023

(30) Foreign Application Priority Data

Aug. 5, 2021 (JP) .................. 2021-129078

(51) Int. Cl.
*G06V 10/10* (2022.01)
*G06K 7/10* (2006.01)
*G06V 10/147* (2022.01)
*H04N 3/14* (2006.01)

(52) U.S. Cl.
CPC ......... *G06V 10/19* (2022.01); *G06K 7/10861* (2013.01); *G06K 7/1092* (2013.01); *G06V 10/147* (2022.01); *H04N 3/1562* (2013.01)

(58) Field of Classification Search
CPC .. G06V 10/19; G06V 10/147; G06K 7/10861; G06K 7/1092; H04N 3/1562
USPC ....................................................... 382/182
See application file for complete search history.

(56) References Cited

U.S. PATENT DOCUMENTS

| | | | | |
|---|---|---|---|---|
| 5,216,595 A | * | 6/1993 | Protheroe | G07G 1/145 463/48 |
| 10,198,648 B1 | * | 2/2019 | Bradley | G06V 10/42 |
| 11,257,198 B1 | * | 2/2022 | Holub | G06V 10/82 |
| 11,915,210 B2 | * | 2/2024 | Kang | G06Q 20/20 |
| 2007/0192182 A1 | * | 8/2007 | Monaco | G06Q 30/0238 705/14.36 |
| 2008/0252985 A1 | * | 10/2008 | Zhu | G06K 7/10782 359/641 |
| 2009/0250516 A1 | * | 10/2009 | Tsuchiya | G07G 1/0045 235/383 |
| 2011/0180596 A1 | * | 7/2011 | Iizaka | G07G 1/0045 235/375 |
| 2011/0298703 A1 | * | 12/2011 | Shingu | H04N 5/772 345/207 |
| 2012/0104087 A1 | | 5/2012 | Iizaka | |

* cited by examiner

*Primary Examiner* — Allen H Nguyen
(74) *Attorney, Agent, or Firm* — Amin, Turocy & Watson, LLP (57) ABSTRACT

An aspect is to provide a scanning device, a system, and a method in which an available communication band is not used up even if a plurality of scanning devices are connected to one unit of dedicated hardware. According to one embodiment, a scanning device includes: a camera configured to pick up an image; a reduction unit configured to reduce a data volume of an image corresponding to a merchandise to be outputted to an image recognition device from the image picked up by the camera; and an output unit configured to output the image with the reduced data volume to the image recognition device.

20 Claims, 7 Drawing Sheets

SCANNING DEVICE AND METHOD THEREFOR

CROSS-REFERENCE TO RELATED APPLICATION

This application is based upon and claims the benefit of priority from Japanese Patent Application No. 2021-129078, filed on Aug. 5, 2021, the entire contents of which are incorporated herein by reference.

FIELD

Embodiments described herein relate generally to a scanning device and a method therefor.

BACKGROUND

According to the related art, a scanning device that uses a camera to pick up an image of a merchandise held over the camera, decodes the picked-up image, and reads a symbol such as a barcode or a two-dimensional code attached to the merchandise, is known.

A store selling a merchandise may offer a price reduction of the price of the merchandise. For example, a price reduction sticker is attached to a fresh product that will reach its best-before date soon, and a price reduction of this merchandise is thus offered. A flag sticker indicating that a price reduction sticker is attached to the merchandise is attached near the symbol of the merchandise.

With respect to the merchandise with such a price reduction sticker attached, a machine-learned model is used to recognize the amount of price reduction printed on the price reduction sticker. However, the scanning device is short of hardware performance, that is, its CPU is short of capability, and therefore may not be able to process this recognition. To cope with this, dedicated image processing hardware (hereinafter referred to as "dedicated hardware") is provided externally. The dedicated hardware is equipped with a machine-learned model and uses this model to recognize the amount of price reduction (or the amount of discount) on the price reduction sticker. The dedicated hardware needs high performance equipped with a high-performance CPU and is therefore expensive. One unit of such dedicated hardware is installed externally.

A plurality of scanning devices are connected to the dedicated hardware. Therefore, if all the scanning devices output picked-up images to the dedicated hardware, the available communication band is used up, that is, the communication line connecting the scanning devices and the dedicated hardware is congested, and the images cannot be smoothly outputted, inputted, or transmitted in some cases.

DETAILED DESCRIPTION

An embodiment described herein is to provide a scanning device, a system, and a method in which the available communication band is not used up even if a plurality of scanning devices are connected to one unit of dedicated hardware.

In general, according to one embodiment, a scanning device includes: a camera configured to pick up an image; a reduction unit configured to reduce a data volume of an image corresponding to a merchandise to be outputted to an image recognition device from the image picked up by the camera; and an output unit configured to output the image with the reduced data volume to the image recognition device.

A scanning device and a program according to an embodiment will now be described with reference to the accompanying drawings. This embodiment is one embodiment of the scanning device and the program. The configurations, functions, and the like thereof should not limit the present disclosure.

Figure 1:
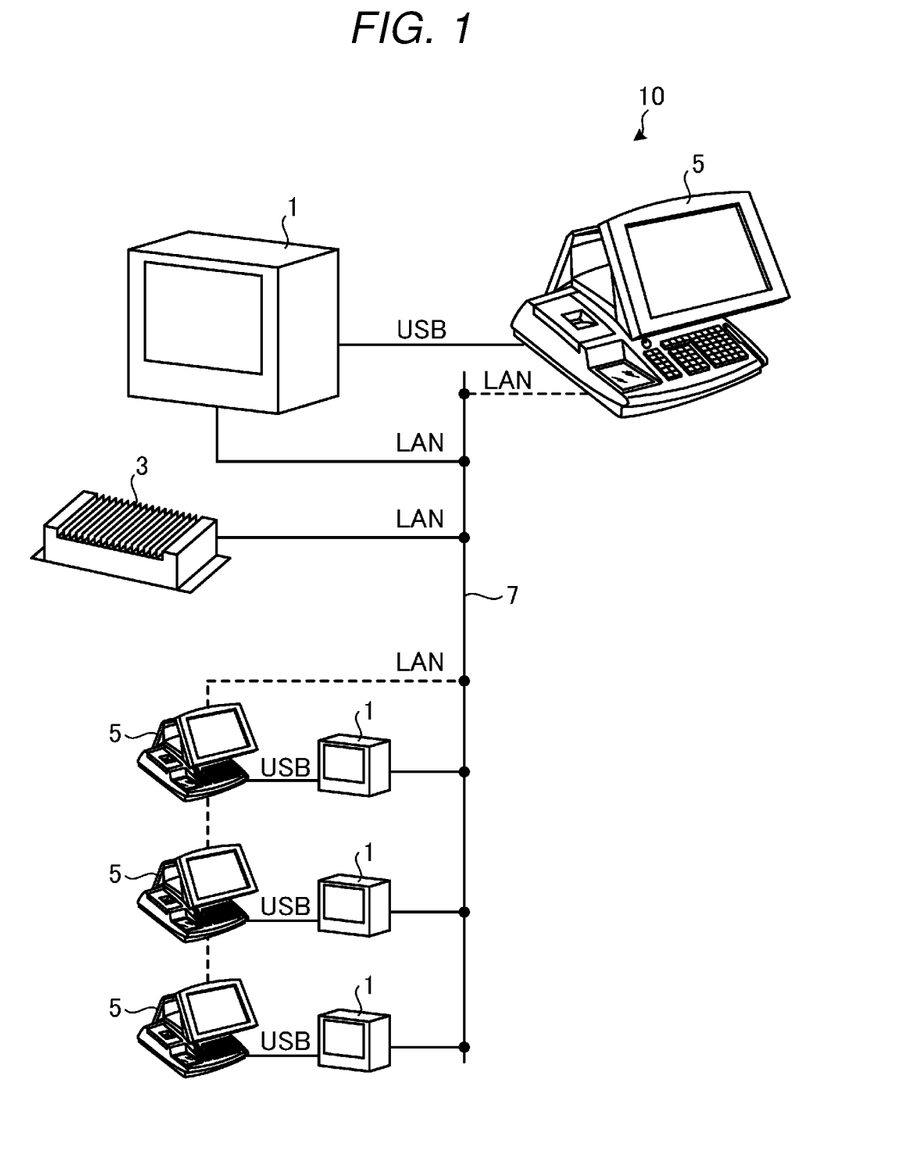
FIG. 1 shows an example of a system according to an embodiment.

FIG. 1 shows an example of the system according to the embodiment. A system 10 shown in FIG. 1 is installed at a store selling a merchandise. Specifically, the system 10 is provided in a settlement section where a settlement for a merchandise purchased by a customer is made. As shown in FIG. 1, the system 10 includes a plurality of combinations of a scanning device 1 and a POS (point-of-sales) terminal 5, which is a merchandise sales data processing device. The scanning device 1 and the POS terminal 5 are connected to each other, for example, via a USB (universal serial bus) cable. In the embodiment shown in FIG. 1, four sets of the scanning device 1 and the POS terminal 5 are provided and all of the scanning devices 1 and the POS terminals 5 are connected together, for example, via a communication line 7 formed by a LAN (local area network). The system 10 also includes dedicated hardware 3 (image recognition device). The dedicated hardware 3 is connected to the communication line 7.

Figure 3:
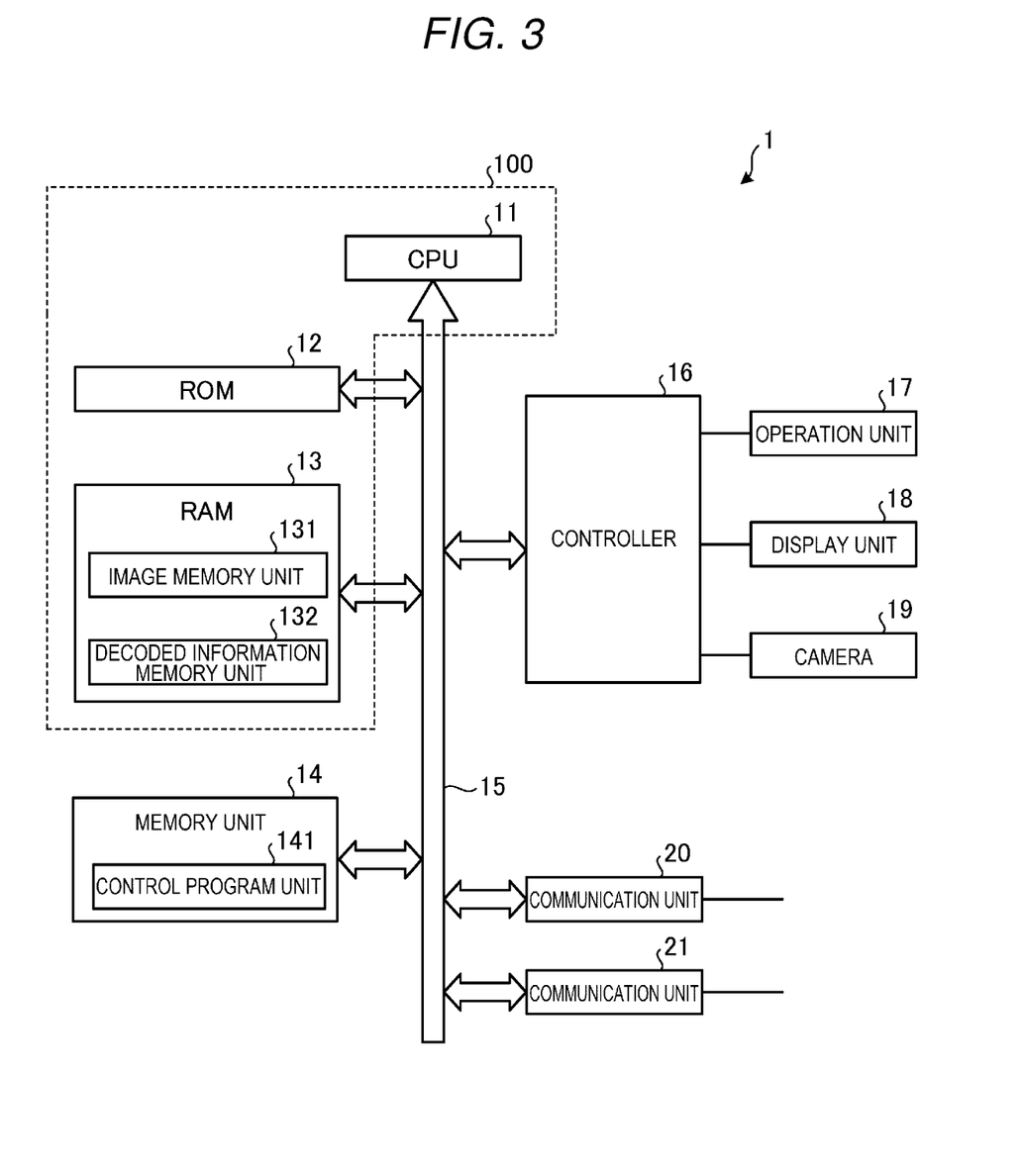
FIG. 3 is a block diagram showing an example of the hardware configuration of a scanning device.

The scanning device 1 has a camera 19 (see FIG. 3). The camera 19 has a photosensor formed by a CCD or a CMOS (complementary metal-oxide semiconductor). The scanning device 1 is, for example, a desktop scanner or a hand-held touch scanner.

The camera 19 reads a symbol formed by, for example, a barcode or a two-dimensional code attached to a merchandise. The camera 19 picks up an image of a merchandise held in front of the camera 19. If the image picked up by the camera 19 includes a symbol, the scanning device 1 slices out an image of the symbol. The scanning device 1 stores the image of the symbol in advance and determines whether the picked-up image includes the stored image of the symbol or not, using a pattern matching technique. If the picked-up image includes the symbol, the scanning device 1 slices out the symbol. The scanning device 1 decodes the symbol thus sliced out and acquires code information. The code information includes information about a merchandise code that specifies the merchandise (merchandise specifying information). The scanning device 1 is equipped with a CPU that is not very high-performance. However, the scanning device 1 can execute processing such as this without generating an excessive load on the CPU.

Incidentally, in addition to the symbol, a price reduction sticker L (see FIG. 2) for reducing the price of the merchandise may be attached to the merchandise. If the price reduction sticker L is attached, a flag sticker T (see FIG. 2) indicating that the price reduction sticker L is attached is attached near the symbol. The flag sticker T is, for example, a sticker in the shape of a double circle, which is a characteristic of the flag sticker T.

The scanning device 1 determines whether the flag sticker T is attached or not, using a pattern matching technique. Whether the flag sticker T is attached or not can be determined by determining whether an image of the double circle is picked up by the camera 19 or not, that is, whether an image of the characteristic of the flag sticker T is picked up or not. Therefore, the scanning device 1 can determine whether the picked-up image includes the flag sticker T or not, without generating an excessive load on the installed CPU.

After determining that the picked-up image includes the flag sticker T, the scanning device 1 outputs the image picked up by the camera 19 to the dedicated hardware 3 continuously for a predetermined time, for example, for one second. Alternatively, after determining that the picked-up image includes the flag sticker T, the scanning device 1 continuously outputs a predetermined number of images, for example, 30 images, picked up by the camera 19 to the dedicated hardware 3. Even if an image of the price reduction sticker L has not been picked up, an image of the price reduction sticker is picked up during the predetermined time or within the predetermined number of images. In the embodiment, the image picked up by the camera 19 is outputted to the dedicated hardware 3 continuously for the predetermined time.

The dedicated hardware 3 recognizes the image inputted from the scanning device 1. The dedicated hardware 3 recognizes the price reduction sticker L, for example, based on the inputted image of the price reduction sticker L. Recognizing the price reduction sticker L means recognizing how much is reduced by the price reduction sticker L shown in the inputted image of the price reduction sticker L.

The dedicated hardware 3 stores a model in which information about a large number of price reduction stickers L is gathered. On a price reduction sticker L, information about an amount of price reduction (for example, an amount or characters corresponding to the price reduction such as "50 yen off", "20% off" or "half price" is printed. Based on the model in which the information about multiple amounts of price reduction printed on the price reduction stickers L is collected and stored, for example, a model that has learned that the price reduction sticker L is a price reduction sticker indicating that the price of the merchandise is reduced by 50 yen if the characters of "50 yen off" are printed on the price reduction sticker L, is stored in the dedicated hardware 3. The model has learned that the price reduction sticker L is a price reduction sticker indicating that the price of the merchandise is reduced by 20% if the characters of "20% off" are printed on the price reduction sticker L. The model has also learned that the price reduction sticker L is a price reduction sticker indicating that the price of the merchandise is halved if the characters of "half price" are printed on the price reduction sticker L. The dedicated hardware 3 inputs, to the model, the image of the price reduction sticker L inputted from the scanning device 1, and the model thus recognizes the amount of price reduced by the price reduction sticker L, based on the result of learning. If an image of the price reduction sticker L with the characters of "50 yen off" printed thereon is inputted, the model, that is, the dedicated hardware 3, recognizes that the price reduction sticker L is a price reduction sticker for a price reduction of 50 yen. If an image of the price reduction sticker L with the characters of "20% off" printed thereon is inputted, the model recognizes that the price reduction sticker L is a price reduction sticker for reducing the price of the merchandise by 20%. If an image of the price reduction sticker L with the characters of "half price" printed thereon is inputted, the model recognizes that the price reduction sticker L is a price reduction sticker for halving the price of the merchandise.

The dedicated hardware 3 decodes the image of the recognized price reduction sticker L. The dedicated hardware 3 outputs the code information of the decoded price reduction sticker L (for example, information of the price reduction of 50 yen) to the scanning device 1 that has transmitted the image of this price reduction sticker L, via the communication line 7.

The scanning device 1 takes in the code information of the decoded price reduction sticker L from the dedicated hardware 3. The scanning device 1 combines together the code information of the previously decoded symbol and the inputted code information of the price reduction sticker L and thus generates, for example, code information of a code 128 (hereinafter referred to as "generated code information"). The generated code information includes the code information of the read symbol (including the merchandise code of the merchandise) and the code information of the price reduction sticker. The scanning device 1 transmits the generated code information to the POS terminal 5. If the image picked up by the camera 19 does not include an image of the flag sticker T, the scanning device 1 does not output the image to the dedicated hardware 3 and transmits the code information of the decoded symbol to the POS terminal 5.

The POS terminal 5 executes merchandise registration processing and settlement processing for the merchandise (transaction with the customer for the selling of the merchandise), based on the code information or the generated code information inputted from the scanning device 1. The merchandise registration processing includes processing of accessing and displaying merchandise information such as the merchandise name and the price of the merchandise, based on the merchandise code included in the code information or the generated code information, and storing the merchandise information (merchandise code, merchandise name, price of merchandise, price reduction information or the like) into a memory. The settlement processing refers to processing of calculating and displaying settlement information such as the total amount and the amount of change in the transaction with the customer, based on the merchandise information about the merchandise on which the merchandise registration processing has been executed. The settlement processing includes processing of dispensing a receipt with the merchandise information and the settlement information about a settled merchandise 60 printed thereon.

Figure 2:
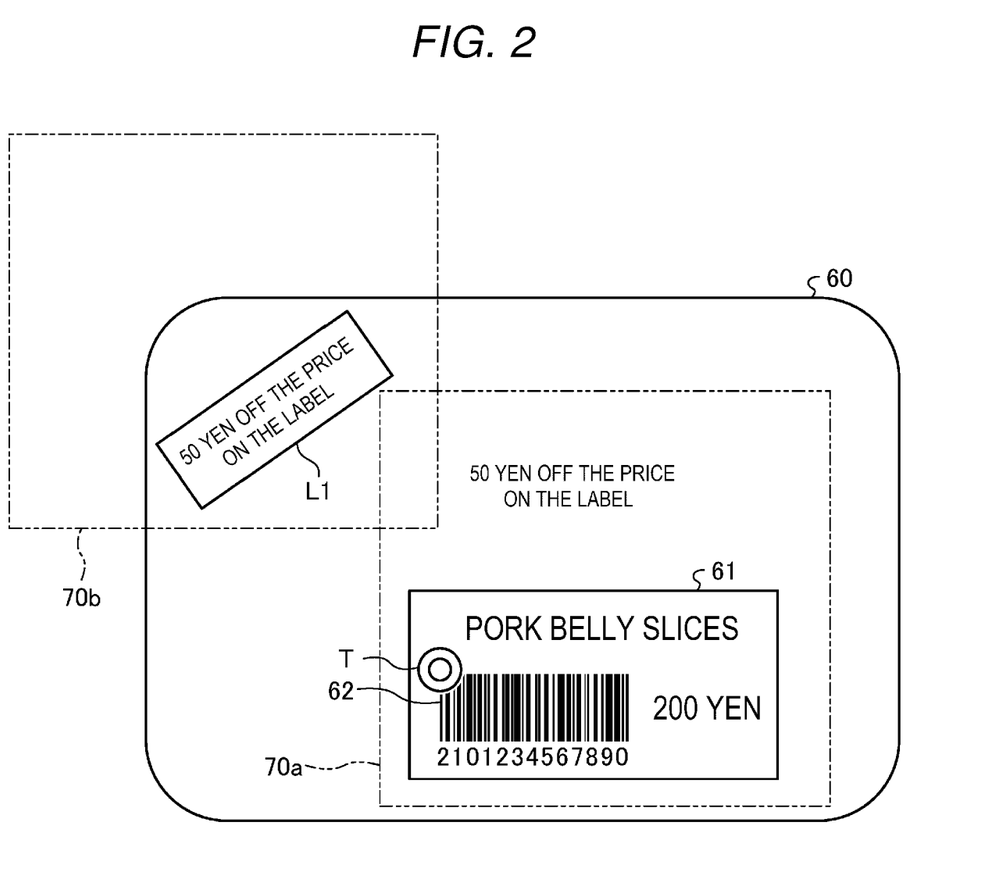
FIG. 2 shows a barcode, a price reduction sticker, and a flag sticker attached to a merchandise.

The price reduction sticker L attached to the merchandise and the flag sticker T will now be described. FIG. 2 shows a barcode, the price reduction sticker L, and the flag sticker T. FIG. 2 shows an example of the relationship between the merchandise 60 and the image pickup area of the camera 19. In FIG. 2, areas surrounded by two-dot chain lines are image pickup areas 70a, 70b, which are areas that can be picked up in one frame by the camera 19. To the merchandise 60 shown in FIG. 2, the price reduction sticker L is attached in addition to a barcode label 61.

The barcode label 61 shows a merchandise name "pork belly slices", a merchandise price "200 yen", and a barcode 62 (symbol) or the like. In the barcode 62, information such as the merchandise code is embedded as the merchandise information that is necessary for the POS terminal 5 to execute the merchandise registration processing on the sales data of the merchandise 60. Also, the merchandise code "2101234567890" embedded in the barcode 62 is shown in the form of numbers below the barcode 62. The price reduction sticker L shows character information "50 yen off the price on the label" showing the amount of price reduction for the merchandise 60.

Also, the flag sticker T indicating that the price reduction sticker L is attached to the merchandise 60 is attached to the merchandise 60. The flag sticker T includes a different geometric shape from the shape of an element forming the symbol. That is, the barcode 62 is formed by a plurality of bars and therefore the flag sticker T includes a circle, a circumference or a triangle, which is a different shape from the shape of the bars, or a quadrilateral with a different aspect ratio from the bars in the barcode 62, or the like.

A preferable embodiment of the flag sticker T includes two or more concentric shapes. A more preferable embodiment is a double circle including two concentric circumferences. Each circumference is preferably formed by a bold line with a predetermined thickness.

The flag sticker T may be attached in such a way as not to overlap the barcode 62 or in such a way as to overlap a part of the barcode 62. However, in any case, the flag sticker T is attached in such a way that the barcode 62 can be decoded.

If the barcode 62 and the price reduction sticker L are spaced apart from each other on the merchandise 60 as shown in FIG. 2, the barcode 62 and the price reduction sticker L may not fall within the same image pickup area of the camera 19. Therefore, in the embodiment, as will be described in detail later, if the flag sticker T is decoded, the camera 19 subsequently picks up an image continuously for a predetermined time in such a way as to make sure that an image of the price reduction sticker L is picked up, and the camera 19 outputs this image to the dedicated hardware 3.

The hardware of the scanning device 1 will now be described. FIG. 3 is a block diagram showing an example of the hardware configuration of the scanning device 1. As shown in FIG. 3, the scanning device 1 has a CPU (central processing unit) 11, a ROM (read-only memory) 12, a RAM (random-access memory) 13, a memory unit 14, and the like. The CPU 11 serves as a control center. The ROM 12 stores various programs. In the RAM 13, programs and various data are loaded. The memory unit 14 stores various programs. The CPU 11, the ROM 12, the RAM 13, and the memory unit 14 are connected to each other via a bus 15. The CPU 11, the ROM 12, and the RAM 13 together form a control unit 100. That is, the control unit 100 executes control processing in the scanning device 1, described later, by having the CPU 11 operate according to a control program stored in the ROM 12 or the memory unit 14 and loaded in the RAM 13.

The RAM 13 has an image memory unit 131 and a decoded information memory unit 132. The image memory unit 131 stores an image of a merchandise picked up by the camera 19. The decoded information memory unit 132 stores code information formed by decoding a symbol (for example, the barcode 62 in FIG. 2) included in the image stored in the image memory unit 131.

The memory unit 14 is formed by a non-volatile memory such as an HDD (hard disk drive) or a flash memory, which holds the stored information even if the power is turned off. The memory unit 14 has a control program unit 141 storing a control program for controlling the scanning device 1.

The control unit 100 is connected to an operation unit 17, a display unit 18, and the camera 19 via the bus 15 and a controller 16.

The operation unit 17 is a keyboard or a touch panel, for example, and is operated by the operator of the scanning device 1. The display unit 18 is a liquid crystal display, for example, and displays information to the operator of the scanning device 1.

The control unit 100 is also connected to a communication unit 20 via the bus 15. The communication unit 20 is connected to the dedicated hardware 3 via the communication line 7 and transmits and receives information to and from the dedicated hardware 3.

The control unit 100 is also connected to a communication unit 21 via the bus 15. The communication unit 21 is connected to the POS terminal 5 via a USB cable and outputs information to the POS terminal 5.

Figure 4:
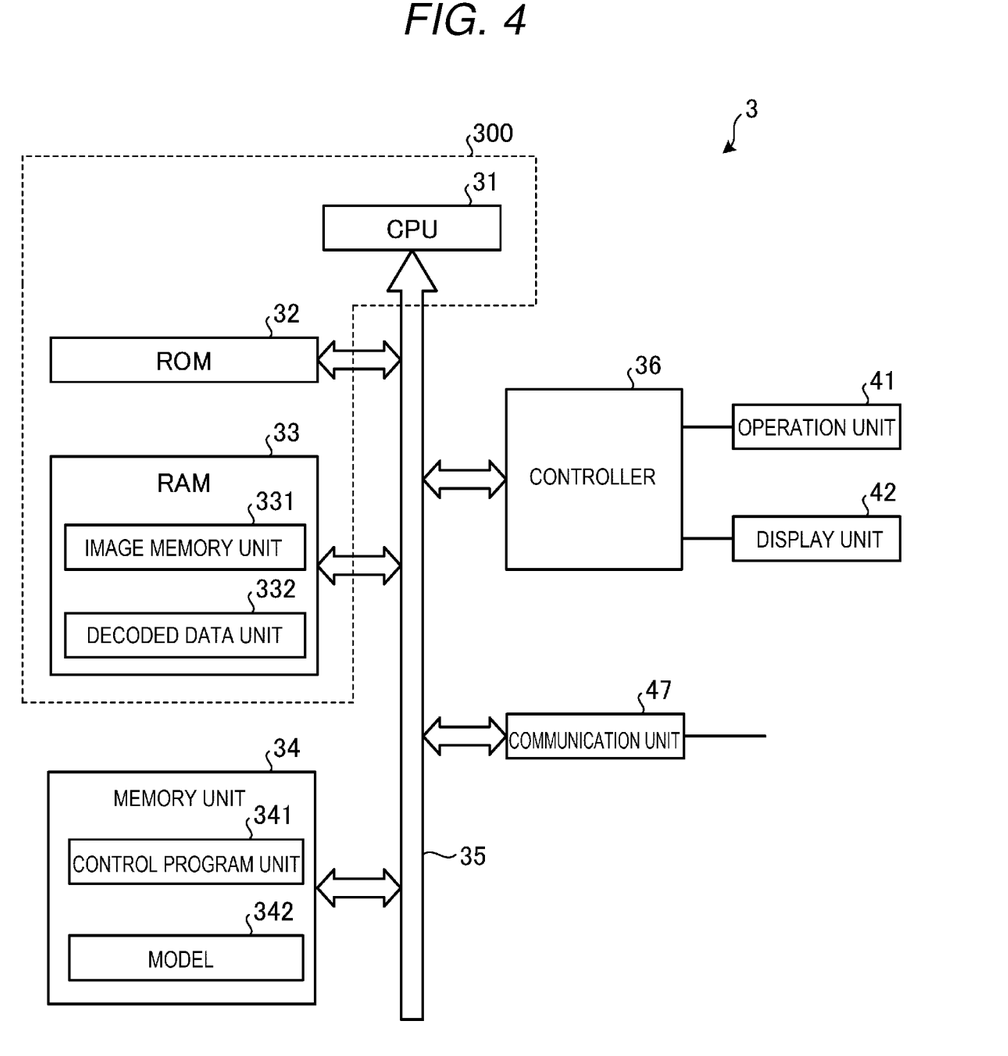
FIG. 4 is a block diagram showing an example of the hardware configuration of dedicated hardware.

The hardware of the dedicated hardware 3 will now be described. FIG. 4 is a block diagram showing an example of the hardware configuration of the dedicated hardware 3. As shown in FIG. 4, the dedicated hardware 3 has a CPU 31, a ROM 32, a RAM 33, a memory unit 34 and the like. The CPU 31 serves as a control center. The ROM 32 stores various programs. In the RAM 33, programs and various data are loaded. The memory unit 34 stores various programs. The CPU 31, the ROM 32, the RAM 33, and the memory unit 34 are connected to each other via a bus 35. The CPU 31, the ROM 32, and the RAM 33 together form a control unit 300. That is, the control unit 300 executes control processing in the dedicated hardware 3, described later, by having the CPU 31 operate according to a control program stored in the ROM 32 or the memory unit 34 and loaded in the RAM 33.

The RAM 33 has an image memory unit 331 and a decoded data unit 332. The image memory unit 331 stores data of an image inputted from the scanning device 1. The decoded data unit 332 stores code information decoded based on the image memory unit 331 (in the embodiment, code information formed by decoding an image of the price reduction sticker L).

The memory unit 34 is formed by a non-volatile memory such as an HDD (hard disk drive) or a flash memory, which holds the stored information even if the power is turned off. The memory unit 34 stores a control program unit 341 storing a control program for controlling the dedicated hardware 3, and a model 342. The model 342 is a model formed by collecting and storing image information about multiple types of price reduction stickers L and learning how much (how many yen) is reduced by the inputted price reduction sticker L, based on the image information. The model outputs one result of estimation (result of estimating how much is reduced by the price reduction sticker), based on an image of the inputted price reduction sticker. The control unit 300 inputs the image of the price reduction sticker L stored in the image memory unit 331 into the model 342 and thus recognizes how much is reduced by the price reduction sticker L.

The control unit 300 is connected to an operation unit 41 and a display unit 42 via the bus 35 and a controller 36.

The operation unit 41 is a keyboard or a touch panel, for example, and is operated by the operator of the dedicated hardware 3. The display unit 42 is a liquid crystal display, for example, and displays information to the operator of the dedicated hardware 3.

The control unit 300 is also connected to a communication unit 47 via the bus 35. The communication unit 47 is connected to the scanning device 1 via the communication line 7 and transmits and receives information to and from the scanning device 1.

Figure 5:
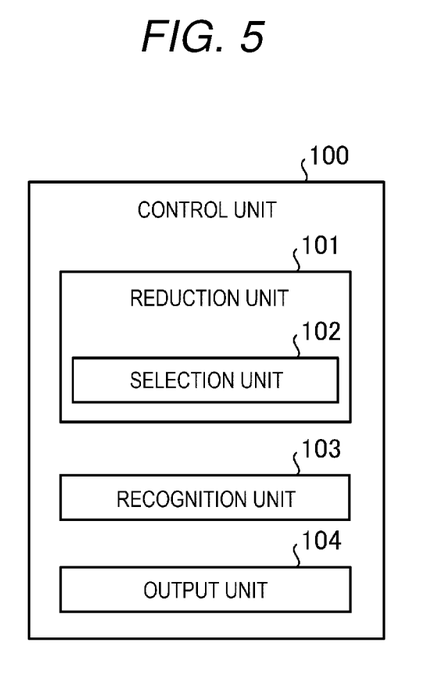
FIG. 5 is a functional block diagram showing an example of the functional configuration of the scanning device.

The functional configuration of the scanning device 1 will now be described. FIG. 5 is a functional block diagram showing an example of the functional configuration of the scanning device 1. As shown in FIG. 5, the control unit 100 of the scanning device 1 operates according to the control program stored in the ROM 12 or the control program unit 141 of the memory unit 14 and thus functions as a reduction unit 101, a selection unit 102, a recognition unit 103, and an output unit 104.

The reduction unit 101 reduces the data volume of the image to be outputted to the dedicated hardware 3 from the image picked up by the camera 19.

The selection unit 102 is an example of the reduction unit 101. The selection unit 102 selects the image to be outputted to the dedicated hardware 3 from the image picked up by the camera 19. As the selection unit 102 selects the image to be outputted to the dedicated hardware 3 from the image picked up by the camera 19, the data volume of the image to be outputted to the dedicated hardware 3 is reduced.

The recognition unit 103 recognizes the flag sticker T indicating that the price reduction sticker L is attached.

As the image of the flag sticker T is recognized, the selection unit 102 selects the image to be outputted to the dedicated hardware 3 picked up by the camera 19 continuously for a predetermined time.

The output unit 104 outputs the image with the reduced data volume to the dedicated hardware 3. Specifically, the output unit 104 outputs the image to be outputted to the dedicated hardware 3 from the image picked up by the camera 19 that is selected by the selection unit 102. More specifically, if the recognition unit 103 recognizes the flag sticker T, the output unit 104 outputs the image picked up by the camera 19 to the dedicated hardware 3 continuously for the predetermined time.

Figure 6:
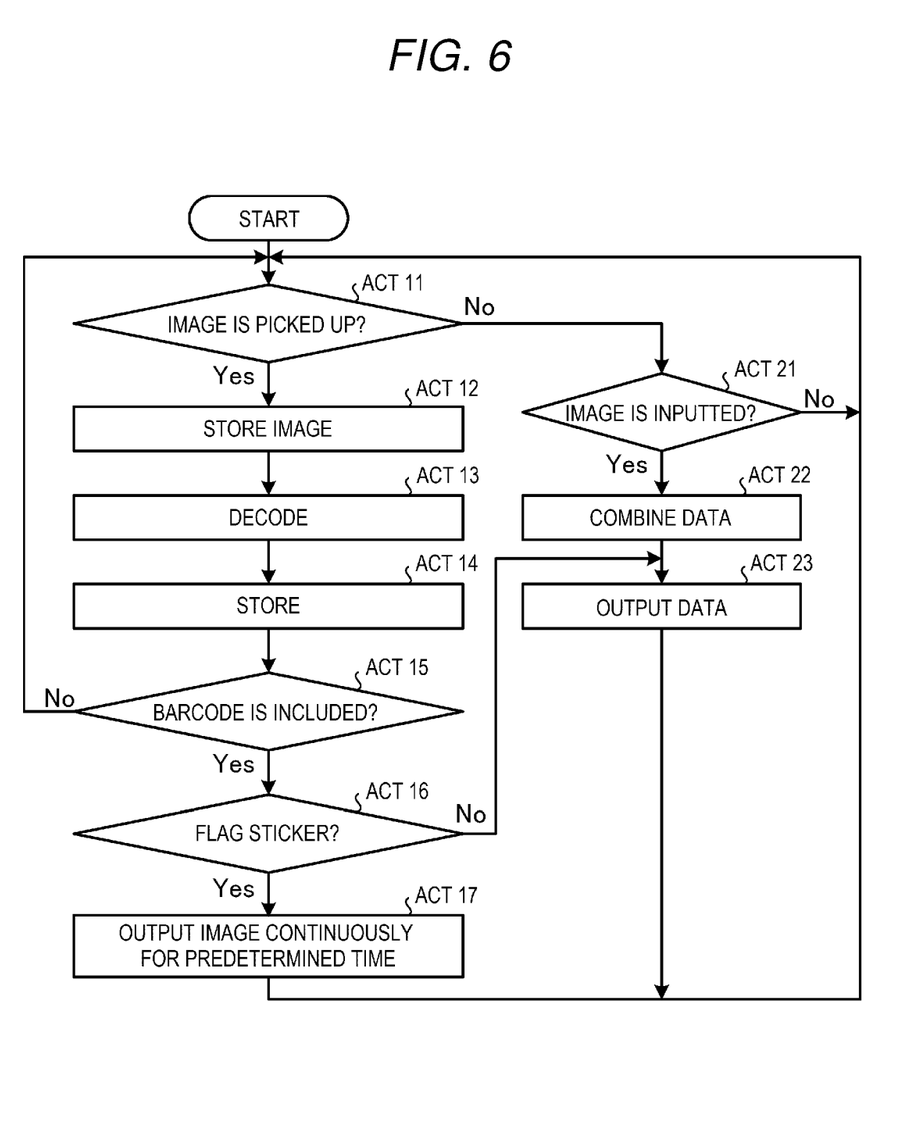
FIG. 6 is a flowchart showing an example of control processing in the scanning device.

The control of the scanning device 1 will now be described. FIG. 6 is a flowchart showing an example of the control processing in the scanning device 1. As shown in FIG. 6, the control unit 100 of the scanning device 1 determines whether the camera 19 has picked up an image or not (ACT 11). If the camera 19 has picked up an image (YES in ACT 11), the control unit 100 stores the picked-up image in the image memory unit 131 (ACT 12). Next, the control unit 100 decodes the image stored in the image memory unit 131 and thus generates code information (ACT 13). The control unit 100 then stores the generated code information in the decoded information memory unit 132 (ACT 14).

Next, the selection unit 102 determines whether the code information stored in the decoded information memory unit 132 includes the code information about the barcode 62 (symbol) or not (ACT 15). If it is determined that the code information about the barcode 62 is included (YES in ACT 15), the recognition unit 103 determines whether the code information stored in the decoded information memory unit 132 includes the code information about the flag sticker T or not (whether the flag sticker T is recognized or not) (ACT 16). The selection unit 102 includes the processing of ACT 15. The reduction unit 101 includes the processing of ACTs 15 and 16. If it is determined that the code information about the flag sticker T is included (YES in ACT 16), the output unit 104 outputs the image picked up by the camera 19 to the dedicated hardware 3 continuously for a predetermined time (ACT 17). The outputted image is sent to the dedicated hardware 3 via the communication line 7.

That is, if the code information decoded by the recognition unit 103 includes the code information about the flag sticker T, the selection unit 102 subsequently selects the image picked up by the camera 19 continuously for a predetermined time. The output unit 104 then outputs the selected image to the dedicated hardware 3. The control unit 100 then returns to ACT 11.

If it is determined in ACT 15 that the code information about the barcode 62 (symbol) is not included (NO in ACT 15), the control unit 100 returns to ACT 11. If it is determined in ACT 16 that the flag sticker T is not recognized (NO in ACT 16), the control unit 100 outputs the code information about the barcode 62 stored in ACT 14 to the POS terminal 5 (ACT 23).

If it is determined in ACT 11 that the camera 19 has not picked up an image (NO in ACT 11), the control unit 100 determines whether a decoded image is inputted from the dedicated hardware 3 or not (ACT 21). As will be described in detail later with reference to FIG. 7, code information formed by decoding the image of the price reduction sticker L is inputted from the dedicated hardware 3. If it is determined that the decoded image is inputted from the dedicated hardware 3 (YES in ACT 21), the control unit 100 combines together price reduction information included in the code information and the code information about the barcode 62 stored in ACT 14 and thus generates one piece of generated code information (ACT 22). The control unit 100 then outputs the generated code information to the POS terminal 5 (ACT 23). The control unit 100 then returns to ACT 11. If it is determined that the decoded image is not inputted from the dedicated hardware 3 (NO in ACT 21), the control unit 100 returns to ACT 11.

Figure 7:
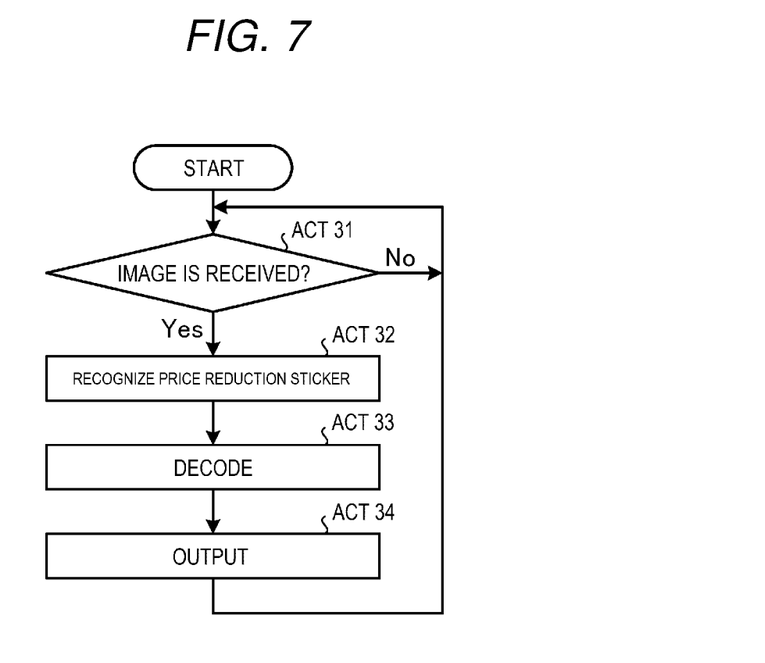
FIG. 7 is a flowchart showing an example of control processing in the dedicated hardware.

The control of the dedicated hardware 3 will now be described. FIG. 7 is a flowchart showing an example of the control processing in the dedicated hardware 3. As shown in FIG. 7, the control unit 300 of the dedicated hardware 3 determines whether the image acquired by the processing of ACT 17 is inputted from the scanning device 1 or not (ACT 31). The control unit 300 waits until the image is inputted (NO in ACT 31). If it is determined that the image is inputted from the scanning device 1 (YES in ACT 31), the control unit 300 inputs this image into the model 342 and recognizes the price reduction sticker L, based on an output from the model (ACT 32). That is, the control unit 300 recognizes how much is reduced by the price reduction sticker, based on the machine-learned model 342.

Next, the control unit 300 decodes the recognized price reduction sticker L and generates code information (ACT 33). The control unit 300 then outputs the generated code information about the price reduction sticker L to the scanning device 1 (ACT 34). The outputted code information is sent to the scanning device 1 via the communication line 7. The control unit 300 then returns to ACT 31.

In this way, the scanning device 1 according to the embodiment has the camera 19 picking up an image, the recognition unit 103 recognizing the flag sticker T, the selection unit 102 selecting an image corresponding to a merchandise to be outputted to the dedicated hardware 3 from the image picked up by the camera 19 if the recognition unit 103 has recognized the flag sticker T, and the output unit 104 outputting only the image selected by the selection unit 102 to the dedicated hardware 3.

Such a scanning device 1 according to the embodiment outputs only the image selected by the selection unit 102 to the dedicated hardware 3 via the communication line 7. Therefore, even if a plurality of scanning devices 1 are connected to one unit of dedicated hardware 3, the available communication band is not used up.

Since only the selected image is inputted to the dedicated hardware 3 from the scanning device 1, the processing by the dedicated hardware 3 is reduced and therefore the load on the dedicated hardware 3 is reduced.

As a modification example of the embodiment, the reduction unit 101 may execute the processing of slicing out an image sliced out to include the price reduction sticker L from the image picked up by the camera 19. In this case, the output unit 104 outputs the image sliced out by the reduction unit 101 to the dedicated hardware 3. In such a modification example, too, the scanning device 1 outputs only the sliced-out image to the dedicated hardware 3 via the communication line 7. Therefore, even if a plurality of scanning devices 1 are connected to one unit of dedicated hardware 3, the available communication band is not used up.

As a second modification example of the embodiment, the reduction unit 101 may function as a compression unit configured to compress the image picked up by the camera 19 and thus reduce the data volume. In this case, the image compressed by the compression unit and having the reduced data volume is outputted to the dedicated hardware 3 via the communication line 7. Therefore, even if a plurality of scanning devices 1 are connected to one unit of dedicated hardware 3, the available communication band is not used up.

While an embodiment of the present disclosure has been described, this embodiment is presented simply as an example and is not intended to limit the scope of the present disclosure. This novel embodiment can be carried out in various other forms and can include various omissions, replacements, and modifications without departing from the spirit and scope of the present disclosure. The embodiment and the modifications thereof are included in the spirit and scope of the present disclosure and also included in the scope of the claims and equivalents thereof.

For example, in the embodiment, a plurality of sets, each made up of one scanning device 1 and one POS terminal 5 connected together, are connected to the communication line 7. However, this is not limiting. For example, a plurality of scanning devices 1 may be connected to one POS terminal 5 via the communication line 7. In this case, the scanning devices 1 may be built in the POS terminal 5.

The program executed by the scanning device 1 according to the embodiment is recorded as a file in an installable format or an executable format in a computer-readable recording medium such as a CD-ROM, flexible disk (FD), CD-R, or DVD (digital versatile disk), and provided in this form.

The program executed by the scanning device 1 according to the embodiment may be stored on a computer connected a network such as the internet and may be downloaded via the network and thus provided. The program executed by the scanning device 1 according to the embodiment may be provided or distributed via a network such as the internet.

The program executed by the scanning device 1 according to the embodiment may be each incorporated in the ROM or the like in advance and thus provided.

What is claimed is:

1. A scanning device, comprising:
  a camera configured to pick up an image;
  a reduction component configured to reduce a data volume of an image corresponding to a merchandise to be outputted to an image recognition device from the image picked up by the camera,
    wherein the reduction component comprises a selection component configured to select the image corresponding to the merchandise to be outputted to the image recognition device from the image picked up by the camera, or
    wherein the reduction component comprises a compression component configured to compress the image corresponding to the merchandise to be outputted to the image recognition device from the image picked up by the camera, resulting in a reduced data volume of the image; and
  an output component configured to output the image with the reduced data volume to the image recognition device.

2. The scanning device according to claim 1, wherein the output component outputs only the image selected by the selection component.

3. The scanning device according to claim 2, further comprising:
  a recognition component configured to recognize a flag sticker attached to the merchandise, the flag sticker indicating that a price reduction sticker is attached to the merchandise, wherein
  if an image of the flag sticker is recognized, the selection component selects an image that is subsequently picked up by the camera continuously for a predetermined time, as the image to be outputted to the image recognition device.

4. The scanning device according to claim 3, wherein the recognition component recognizes a shape characteristic of the flag sticker.

5. The scanning device according to claim 1, wherein the reduction component slices out and outputs the image to be outputted to the image recognition device from the image picked up by the camera.

6. The scanning device according to claim 1, wherein the camera is configured to pick up a two dimensional code.

7. The scanning device according to claim 1, wherein the camera is configured to pick up a barcode.

8. A method for a scanning device comprising a camera for picking up an image, the method comprising:
  reducing a data volume of an image to be outputted to an image recognition device from the image picked up by the camera,
    wherein the reducing the data volume of the image comprises selecting the image corresponding to a merchandise to be outputted to the image recognition device from the image picked up by the camera, or
    wherein the reducing the data volume of the image comprises compressing the image corresponding to the merchandise to be outputted to the image recognition device from the image picked up by the camera, resulting in a reduced data volume of the image; and
  outputting the image with the reduced data volume to the image recognition device.

9. The method according to claim 8, further comprising: outputting only the image selected.

10. The method according to claim 9, further comprising:
  recognizing a flag sticker attached to the merchandise, the flag sticker indicating that a price reduction sticker is attached to the merchandise; and
  when an image of the flag sticker is recognized, selecting an image that is subsequently picked up by the camera continuously for a predetermined time, as the image to be outputted to the image recognition device.

11. The method according to claim 10, further comprising:
recognizing a shape characteristic of the flag sticker.

12. The method according to claim 8, further comprising:
slicing out and outputting the image to be outputted to the image recognition device from the image picked up by the camera.

13. The method according to claim 8, further comprising:
picking up a two dimensional code.

14. A settlement system, comprising:
a POS terminal; and
scanning device, comprising:
   a camera configured to pick up an image;
   a reduction component configured to reduce a data volume of an image corresponding to a merchandise to be outputted to an image recognition device from the image picked up by the camera,
      wherein the reduction component comprises a selection component configured to select the image corresponding to the merchandise to be outputted to the image recognition device from the image picked up by the camera, or
      wherein the reduction component comprises a compression component configured to compress the image corresponding to the merchandise to be outputted to the image recognition device from the image picked up by the camera, resulting in a reduced data volume of the image; and
   an output component configured to output the image with the reduced data volume to the image recognition device.

15. The settlement system according to claim 14, wherein the output component outputs only the image selected by the selection component.

16. The settlement system according to claim 15, further comprising:
   a recognition component configured to recognize a flag sticker attached to the merchandise, the flag sticker indicating that a price reduction sticker is attached to the merchandise, wherein
   if an image of the flag sticker is recognized, the selection component selects an image that is subsequently picked up by the camera continuously for a predetermined time, as the image to be outputted to the image recognition device.

17. The settlement system according to claim 16, wherein the recognition component recognizes a shape characteristic of the flag sticker.

18. The settlement system according to claim 14, wherein the reduction component slices out and outputs the image to be outputted to the image recognition device from the image picked up by the camera.

19. The settlement system according to claim 14, wherein the camera is configured to pick up a two dimensional code or a barcode.

20. The settlement system according to claim 14, comprising a plurality of scanning devices and a plurality of POS terminals.

* * * * *